Patented Nov. 6, 1934

1,979,986

UNITED STATES PATENT OFFICE 1,979,986

CELLULOSIC COMPOSITION

Harry S. Mork, Brookline, Mass.

No Drawing. Application May 20, 1931,
Serial No. 538,869

6 Claims. (Cl. 106—40)

In the practical application of cellulose compounds, including cellulose esters, to the various arts and manufactures, such as the production of lacquers, varnishes, films, filaments, plastic masses, etc., it is frequently the practice to blend or mix with, or otherwise add to, the cellulose compound, certain non-cellulosic materials commonly termed plasticizers, camphor substitutes or the like. Such additions are made for the purpose of imparting to the cellulose compound some desired properties, such as flexibility, non-inflammability, plasticity under heat, etc. The term "plasticizers" includes a wide variety of such added materials. Different plasticizers functions differently and with various different effects in cellulosic combinations; and the properties which they respectively impart to the product depend on, and are determined by, both the physical and chemical properties of the particular plasticizer used.

To function usefully, a plasticizer need not invariably be a solvent of the ester or other cellulose compound with which it is to be mixed or combined. However, plasticizers which are solvents of the cellulose compound at normal, or moderately elevated, temperatures are more generally useful and effective than those which are non-solvents, and have the additional merit of enabling semi-solvent or non-solvent plasticizers or compounds to be blended conjunctively with the solvent plasticizer and the cellulosic compound, and to broader advantage.

While it is known that solvents of cellulose compounds, and particularly of cellulose ethers and esters, classify themselves in a general way in groups of similar chemical series or type formulæ, there is nevertheless much divergence by individual members of the series or type from such group classifications. Therefore the fact that a particular compound happens to be located in a certain series, group, or type, does not offer positive evidence that it will have the solvent properties generally characteristic of the series, group or type. For example, chloroform (CHCl₃) is a solvent for cellulose acetate. If one atom of chlorine is replaced by one atom of hydrogen, giving the dichlormethane, the resultant product is still a solvent of cellulose acetate. But if on the other hand one atom of chlorine is substituted for the hydrogen atom in chloroform, forming tetrachlormethane, or carbon tetrachloride, the product is a non-solvent of cellulose acetate. It is a fairly general characteristic of the solvents of cellulose esters that, in any particular series or type, the solvent powers tend to decrease with increasing molecular weight of the members of that series; and solvent power may be wholly lost in the higher or heavier members of the series. Therefore it is not possible to predicate definitely by a priori reasoning whether or not any substance or material will be a solvent for a cellulose ether, ester, or other compound, or will otherwise function usefully therewith.

W. H. Walker in U. S. Patent 774,713 has shown that phenol ($C_6H_5OH$), and some other phenols, are solvents and plasticizers of cellulose acetate. The solvent powers of the different phenols vary. For example, phenol itself ($C_6H_5OH$) is a most powerful solvent, while the cresols ($CH_3C_6H_4OH$) are less powerful solvents. This is one example of solvent powers diminishing with increasing molecular weight and the diminishing ratio of the OH group to the total molecular weight. But, notwithstanding this general tendency, it is not possible to predict whether or not phenols of higher molecular weight, or of any particular formula, will be solvents or plasticizers of cellulose compounds.

Moreover, practically all the phenols which have been heretofore available commercially have one or more of several objectionable properties, such as disagreeable odor, persistency of odor, high volatility, high cost, excessive discoloration on exposure to light, and others.

I have discovered that phenyl phenol ($C_6H_5C_6H_4OH$), and particularly orthophenyl phenol, is an excellent plasticizer for cellulose acetate and equivalent compounds of cellulose, and in the fused condition is an excellent solvent of these collulose compounds. It has other advantageous properties, in that it is comparatively cheap, its odor is moderate and not unpleasant, its volatility at normal temperatures is comparatively low, it is practically colorless, and its tendency to discolor when exposed to light is relatively small.

Orthophenyl phenol is crystalline but its melting point is fairly low, the commercial product melting at about 57° C. It has the property, similar to that of some other phenols, but apparently to a more marked degree, of forming permanently liquid mixtures with other crystalline substances and liquids, when melted together therewith, and through a wide range of proportions. For example, if one part by weight of orthophenyl phenol and one part by weight of triphenyl phosphate are melted together, the resulting liquid mixture remains liquid even when chilled to 0° C. Similarly, if one part of orthophenyl phenol is mixed with one part of castor oil, and the temperature is raised until the crystalline orthophenyl phenol melts, the resulting liquid mixture will remain liquid when cooled to normal temperatures, and lower.

Generally speaking, liquid plasticizers produce more flexible films and masses with cellulose compounds than do solid plasticizers. For example, a film (a) prepared from a solution of 100 parts cellulose acetate and 50 parts orthophenyl phenol dissolved in a mutual solvent such as acetone, will be harder and less pliable than another film (b) made from 100 parts cellulose acetate, 25 parts orthophenyl phenol and 25 parts triphenyl phosphate. As explained above, while each by itself is a crystalline solid, orthophenyl phenol and triphenyl phosphate when melted together form a liquid which remains such at normal temperatures. This same condition is brought about by solution in a mutual solvent and subsequent evaporation of the solvent. Film (b) described above will be more difficulty inflammable than film (a) owing to the fact that triphenyl phosphate is not inflammable and imparts this characteristic to cellulose compounds and other compounds, to a greater or less degree according to the proportion used.

It will be understood from the foregoing description of my discovery that the same comprises not only the new composition consisting of a cellulose compound and phenyl phenol in any of its isomers (i. e., ortho-, meta-, and paraphenyl phenol), but also including these constitutents plus triphenyl phosphates, and equivalents of the latter. That is, the protection which I claim is not limited exclusively to phenyl phenol in combination with a cellulose compound. Neither is it limited to the triphenyl phosphates exclusively as the third constituent of the complete composition, for other phosphoric acid esters can be used with like effect; and all those phosphoric acid esters which have similar effects to those described above in the comparison of illustrative films (a) and (b) are equivalents of triphenyl phosphate for the purposes of this specification. Also it is to be understood that any suitable pigments, dyes, oils, gums, etc. can be added to the composition in suitable quantities, for utilizing the known qualities of such pigments, etc. to obtain desired effects, such as have been obtained heretofore with such pigments, dyes, oils, gums, etc. in manufactures of cellulose compounds. It is to be further understood that the mention of specific proportions in the description of illustrative films (a) and (b) is not to be taken as limiting my protection to substances in which the ingredients are present in those proportions and no others. On the contrary I may provide these ingredients in any proportions suitable to obtain desired qualities of plasticity or fluidity at various temperatures, all within the scope of the protection which I seek.

What I claim and desire to secure by Letters Patent is:

1. A composition of matter containing cellulose acetate and a phenyl phenol.

2. A composition of matter containing cellulose acetate and orthophenyl phenol.

3. A composition of matter containing cellulose acetate, a phenyl phenol and a phosphoric acid ester.

4. A composition of matter containing cellulose acetate, a phenyl phenol and triphenyl phosphate.

5. A composition of matter containing cellulose acetate, orthophenyl phenol, and a phosphoric acid ester.

6. A composition of matter containing cellulose acetate, orthophenyl phenol, and triphenyl phosphate.

HARRY S. MORK.